No. 803,295. PATENTED OCT. 31, 1905.
J. LASKOWITZ.
DOVETAIL CUTTER.
APPLICATION FILED JUNE 19, 1905.
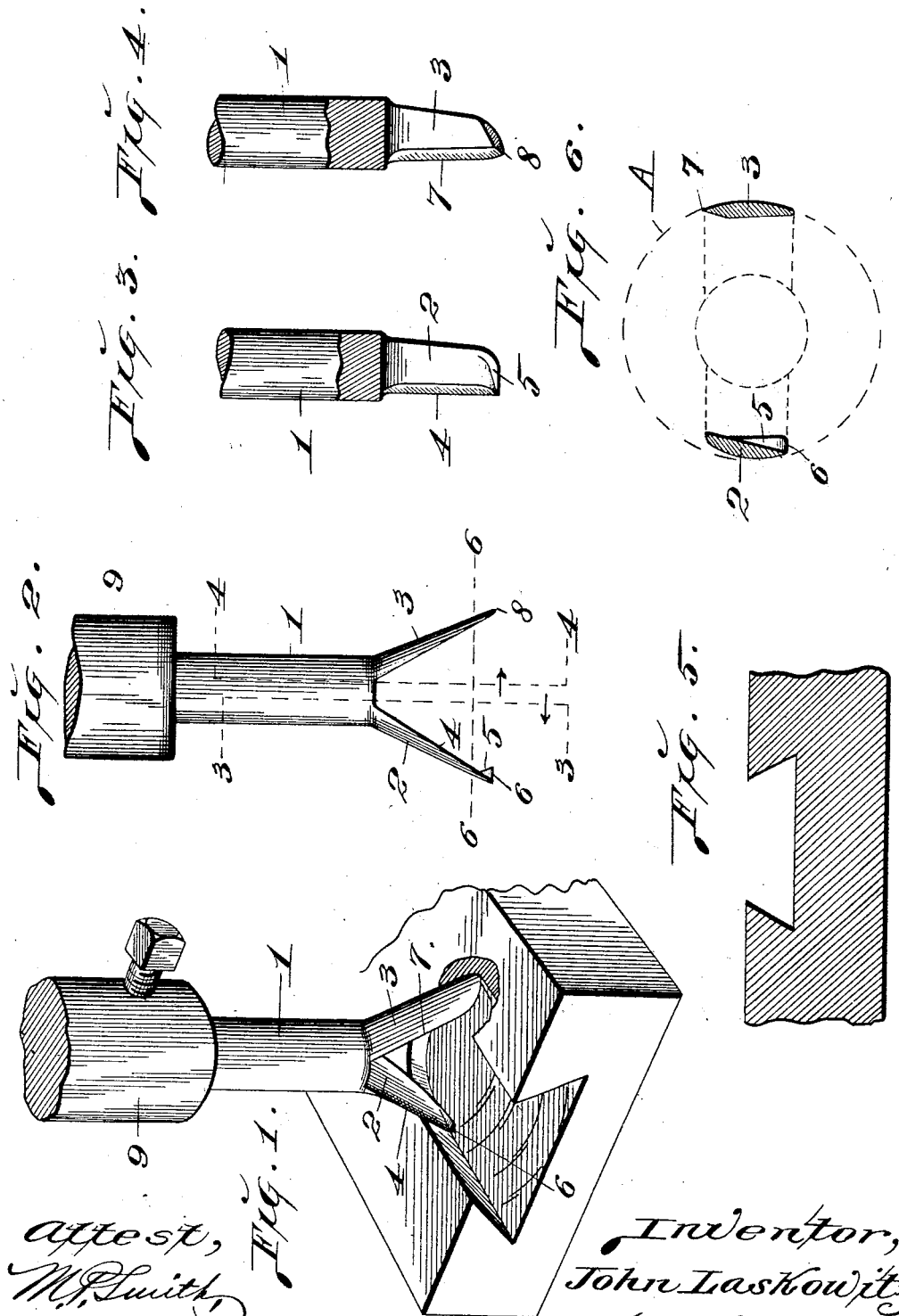
Attest,
M. P. Smith
E. M. Harrington
Inventor,
John Laskowitz
By Higdon & Longan
Attys.

UNITED STATES PATENT OFFICE.

JOHN LASKOWITZ, OF ST. LOUIS, MISSOURI.

DOVETAIL-CUTTER.

No. 803,295.   Specification of Letters Patent.   Patented Oct. 31, 1905.

Application filed June 19, 1905. Serial No. 265,942.

*To all whom it may concern:*

Be it known that I, JOHN LASKOWITZ, a citizen of the United States, and a resident of St. Louis, Missouri, have invented certain new and useful Improvements in Dovetail-Cutters, of which the following is a specification containing a full, clear, and exact description, reference being had to the accompanying drawings, forming a part hereof.

My invention relates to a dovetail-cutter of the rotary type; and the object of my invention is to construct a simple inexpensive cutter which when properly operated will cut a very clean and uniform dovetail groove.

A further object of my invention is to so construct a dovetail-cutter as that the cutting edges thereof are readily accessible to a file or stone that is used in sharpening said cutting edge.

To the above purposes my invention consists in certain novel features of construction and arrangement of parts that will hereinafter be more fully shown, described, and claimed.

In the drawings, Figure 1 is a perspective view of my dovetail-cutter, the same being shown in position for use. Fig. 2 is a side elevation of the cutter. Fig. 3 is a vertical section taken on the line 3 3 of Fig. 2. Fig. 4 is a vertical section taken on the line 4 4 of Fig. 2. Fig. 5 is a detail section illustrating a dovetail groove made by my improved cutter. Fig. 6 is an enlarged horizontal section taken on the line 6 6 of Fig. 2.

Referring by numerals to the accompanying drawings, 1 indicates the shank of my improved cutter, the lower end of which is bifurcated, and the wings 2 and 3 thus formed at the lower end are bent outwardly from the shank, so that the side walls of the dovetail groove formed by my improved cutter will have the proper inclination. The lower end of the wing 2 tapers toward the extreme lower end, and the front edge of said wing is sharpened, as indicated by 4, in order to form a cutting edge. Formed integral with the lower end of wing 2 is a horizontally-arranged lip 5. The front edge 6 is sharpened in order to form a cutting edge. The under side of this lip 5 is made perfectly flat in order to ride smoothly over the bottom of the dovetail groove that is formed by my improved cutter. The opposite wing 3 gradually tapers to the extreme lower end, and the front edge 7 of said wing is sharpened in order to form a cutting edge. At the extreme lower end of this wing is formed a point 8, that is sharpened, and said point occupies the same horizontal plane as does the cutting edge 6 on the front of the lip 5.

It will be understood that the cutting edges 4 and 7 are on opposite sides of the wings 2 and 3, so that when the cutter is rotated these cutting edges will travel in a circular path directly opposite the other. This circular path of travel is indicated by the dotted line A in Fig. 6.

The operation of my improved cutter is as follows: The shank 1 of the cutter is rigidly seated in a chuck or head 9, which occupies a vertical position and which is rotated at a high rate of speed. The material in which the groove is to be formed is located upon a suitable support beneath the cutter and is moved across said support as the groove is formed. As the cutter is rapidly rotating the cutting edges 4 and 7 on the wings 2 and 3 will cut into the material on circular lines, and as the work is moved gradually along the dovetail groove will be formed. The cutting edge 6 on the lip cuts away the base of the material that is being continually cut by the edges 4 and 7, and thus the horizontal bottom of the groove is formed.

By the use of a cutter of my improved construction a very neat and clean groove can be rapidly formed, and when the cutter becomes dull from continual use it can be readily removed from its chuck or retaining head and the cutting edges can be sharpened by means of a file or a whetstone.

An improved cutter constructed as herein described has no detachable parts and is very simple, inexpensive, and efficient in use.

I claim—

A dovetail-cutter, comprising a shank, a pair of wings integral with and extending outwardly and downwardly from said shank directly opposite one another and in the same vertical plane, there being a V-shaped point formed at the lower end of one of the wings and one of the edges of the wing above said point being knife-edged, a horizontally-disposed triangular lip formed integral with the inside of the lower end of the opposite wing, the front edge of which triangular lip is knife-edged and formed on a line at right angles to the front edge of said wing, and the edge of the wing above the lip being knife-edged; substantially as specified.

In testimony whereof I have signed my name to this specification in presence of two subscribing witnesses.

JOHN LASKOWITZ.

Witnesses:
M. P. SMITH,
E. M. HARRINGTON.